(12) United States Patent
Kresge

(10) Patent No.: US 8,884,770 B2
(45) Date of Patent: Nov. 11, 2014

(54) COMPACT DRYER EXHAUST DUCT AND CHIMNEY MANOMETER

(76) Inventor: David W. Kresge, San Diego, CA (US)

( * ) Notice: Subject to any disclaimer, the term of this patent is extended or adjusted under 35 U.S.C. 154(b) by 474 days.

(21) Appl. No.: 13/406,166

(22) Filed: Feb. 27, 2012

(65) Prior Publication Data

US 2012/0218112 A1    Aug. 30, 2012

Related U.S. Application Data

(60) Provisional application No. 61/464,050, filed on Feb. 28, 2011.

(51) Int. Cl.
| | |
|---|---|
| *G08B 21/00* | (2006.01) |
| *G01L 7/18* | (2006.01) |
| *G08B 21/14* | (2006.01) |
| *G01L 19/14* | (2006.01) |
| *G01L 7/16* | (2006.01) |

(52) U.S. Cl.
CPC ............... *G08B 21/14* (2013.01); *G01L 7/187* (2013.01); *G01L 19/14* (2013.01); *G01L 7/163* (2013.01)
USPC ............. 340/626; 73/747; 340/500; 340/540; 340/603

(58) Field of Classification Search
CPC .................................................. B01D 46/0086
USPC ........... 340/626; 73/1.57, 37, 64.46, 713, 747
See application file for complete search history.

(56) References Cited

U.S. PATENT DOCUMENTS

| | | | |
|---|---|---|---|
| 2,411,508 A * | 11/1946 | Dwyer ............................ | 73/713 |
| 3,150,524 A | 9/1964 | Arens | |
| 3,473,387 A | 10/1969 | Meriam | |
| 3,831,448 A * | 8/1974 | Kors et al. .................. | 73/861.65 |
| 4,297,889 A | 11/1981 | Buchanan et al. | |
| 4,365,582 A * | 12/1982 | Boyer et al. .................... | 116/70 |
| 4,380,173 A | 4/1983 | Wozniak | |
| 4,395,232 A * | 7/1983 | Koch .............................. | 432/32 |
| 4,416,157 A | 11/1983 | Cornelison | |
| 4,455,876 A | 6/1984 | McPherson et al. | |
| 4,535,634 A | 8/1985 | Troutman et al. | |
| 4,683,756 A | 8/1987 | Derleth | |
| 5,167,139 A * | 12/1992 | Lafargue et al. .................. | 73/38 |
| 5,352,213 A * | 10/1994 | Woodard ...................... | 604/246 |
| 5,396,802 A * | 3/1995 | Moss .............................. | 73/722 |
| 5,562,537 A * | 10/1996 | Zver et al. ...................... | 454/61 |
| 5,895,862 A * | 4/1999 | Peabody ........................ | 73/747 |
| 2002/0026837 A1* | 3/2002 | Condrea et al. ................ | 73/747 |
| 2009/0249643 A1* | 10/2009 | Harpenau ...................... | 34/524 |

* cited by examiner

*Primary Examiner* — George Bugg
*Assistant Examiner* — Naomi Small
(74) *Attorney, Agent, or Firm* — O'Shea Getz P.C.

(57) ABSTRACT

A cost effective manometer is realized for accurately measuring back pressure in all types of vents and ducts. Common back pressure can be caused by restrictions, such as lint or soot buildup. The manometer consists of a main body having two reservoirs for storage of measuring fluid. The first reservoir contains measuring fluid during transit eliminating the need for end user to manually fill manometer prior to first use. Measuring fluid is transferred to second main reservoir prior to initial use. The second reservoir contains an adjustable bladder or plunger for obtaining a zero reading prior to measurement. The manometer can be used on all types of vents and ducts where positive or negative pressure exists. The manometer can be used for measuring positive or negative pressures as well as differential pressures.

20 Claims, 4 Drawing Sheets

COMPACT DRYER EXHAUST DUCT AND CHIMNEY MANOMETER

Applicant hereby claims priority benefits under 35 U.S.C. §119(e) of U.S. Provisional Patent Application No. 61/464,050 filed Feb. 28, 2011, the disclosure of which is herein incorporated by reference.

BACKGROUND OF THE INVENTION

1. Technical Information

The present disclosure is directed toward compact, inexpensive pressure manometers, particularly those used to measure differential pressures in vent and duct systems.

2. Background Information

The present apparatus relates generally to a manometer used for measuring and indicating pressure differentials and, more particularly, to a compact, inexpensive manometer having two internal reservoirs for containing the measuring liquid with a means for connection of a liquid sensing device for visual and audible output that may also control a safety interruption switch.

A variety of liquid filled manometers for measuring pressure differentials exist in the field. The basic components of a conventional liquid filled manometer are a sensing chamber containing measuring liquid, one end of which is open to the atmosphere and the other end open to the area where the pressure is to be measured. In the case of differential pressure measurement, both ends are connected to the area where pressure will be measured. The liquid used is commonly gage oil with a specific gravity having a red or blue dye. The color of the dye often indicates a higher or lower specific gravity. As the pressure increases or decreases in the sensing chamber, the displacement of the liquid is measured on a relative scale.

Although liquid filled manometers for measuring pressure have been in use for some time, prior art monometers have been mainly manufactured and used in the professional market and are of a larger physical size. No prior art manometer combines the benefits of a compact size, low cost and a means for digitally sensing the liquid gage oil level. In addition, no other prior art monometer incorporates a second storage reservoir for containing the measuring liquid during transit and prior to installation and use.

What is needed, therefore, is an apparatus directed toward the homeowner market that is compact in size and cost effective to monitor changing pressures in their dryer exhaust ducts, chimney flues and heating and air conditioning duct systems, to name a few, and one that can store spare measuring liquid in a second storage reservoir. In addition, an apparatus is needed that may have a digital liquid sensing device used for detecting the level of measuring liquid and outputting the resulting pressure reading to multiple types of receiving stations. Other uses may exist beyond the scope presented here but these are the focus of the present invention.

SUMMARY OF THE INVENTION

According to one aspect of the present invention, a low cost, compact pressure manometer having two internal reservoirs, zero adjusting capabilities and constructed with or without a digital sensor for the measuring liquid is provided. The apparatus may be operated without connecting a power source, such as a battery or electrical power cord, thus allowing the manometer to be installed on most any vertical wall surface. The manometer is generally mounted near a clothes dryer in a visible location. A barbed fitting is installed in the dryer exhaust duct behind the dryer and connected to a section of flexible tubing. This tubing is then connected to a port on the side of the manometer and serves as a conduit for delivering the pressure being measured in the exhaust duct to the manometer. When connected to a dryer exhaust duct, the manometer measures the back pressure in the duct caused by restrictions. These restrictions may be caused by lint buildup, a crushed duct section, a bird's nest, etc. In particular, the manometer is used to monitor the increase in back pressure within the dryer exhaust duct over a period of time.

In similar fashion, the same installation procedure may be used when the manometer is to be used for measuring draft in a chimney flue. Differential pressure in a heating and air conditioning duct system is measured by connecting one tube to the duct work on one side of the furnace filter and a second tube to the ductwork on the opposite side of the filter. The two tubes are then connected to the two ports on the manometer. The resulting pressure measurement is the difference between the two pressures. As the filter loads, the differential pressure will rise.

In another aspect of the present invention, the manometer comprises a storage reservoir used to contain the measuring liquid during transit until used. Said storage reservoir is an important factor in the present invention as it eliminates the need to add measuring liquid to the manometer from an external source and also stores extra liquid for future use. Prior art manometers are generally packaged separate from the measuring liquid. Another important aspect of the present invention relates to a digital sensing device. Under normal, low cost usage, the present invention provides a highly accurate, visual pressure measurement without the use of electric power from a either a battery source or electrical outlet. However, other applications and uses may require communication to electronic devices. Therefore, the present invention may comprise a means for digitally sensing the liquid level in the manometer and converting the pressure reading to an electrical signal to be sent to a receiving device by way of a wired or wireless connection. The receiving device can be a visual indicator comprised of a series of LED lights, an audible alarm, a cell phone, a central alarm system or multitude of other receiving devices. These are just a few examples and not meant to restrict the broad usage of the present invention. A plunger or inflatable bladder is used to adjust the measuring liquid to zero. The said plunger or bladder may be adjusted manual by hand or remotely by means of an electrically operated mechanism.

These and other features and advantages of the present invention will become apparent in light of the drawings and detailed description of the present invention provided below.

DETAILED DESCRIPTION OF THE INVENTION

Figure 1:
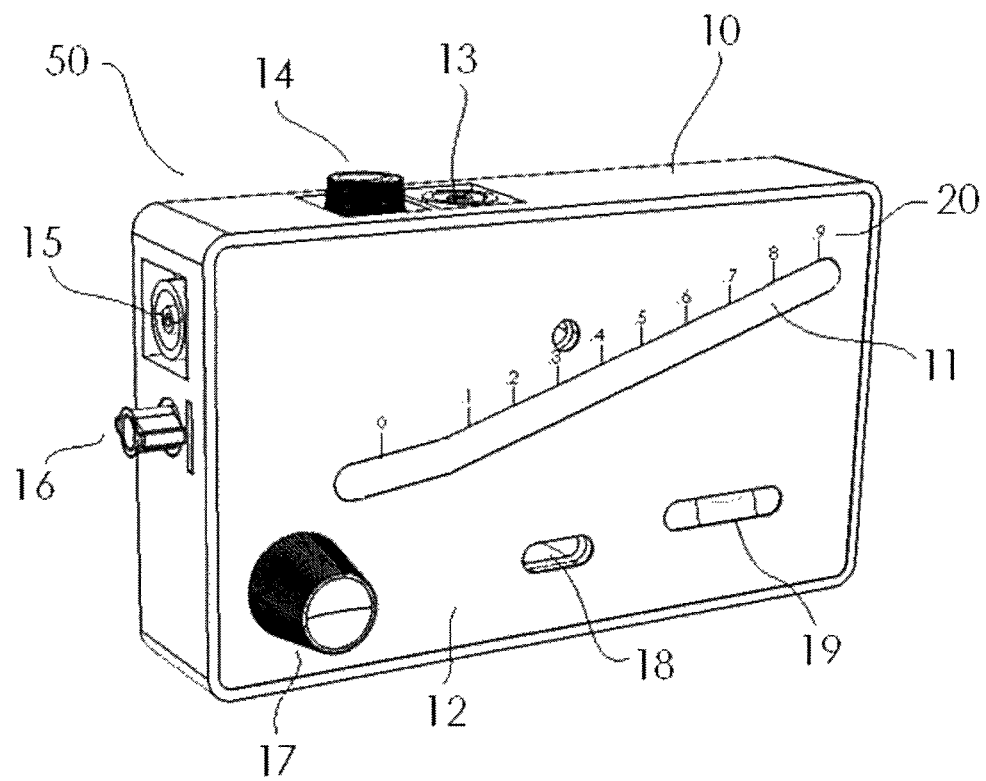
FIG. 1 is a front view diagrammatic representation of one arrangement of the present invention.

Referring to FIG. 1, an embodiment of the compact dryer exhaust duct & chimney manometer 50 is shown. The manometer consists of a base housing assembly 10, a clear sight tube panel 11 and printed cover panel 12. The molded base 10 has a first pressure input port 13 on its top surface, an internal threaded port for connection of cap plug 14, a second pressure input port 15, a threaded port for connection of reservoir valve 16, mounting holes 18 and recessed cavity for level 19. The zero adjustment knob 17 provides a means for manually adjusting the measuring liquid to a zero point on the numeric scale 20. Adjustment is made by turning the knob clockwise to increase the level and counterclockwise to decrease. Level vial 19 insures that the manometer is mounted in a level position for maintaining accurate pressure readings. The numbered scale 20 on front panel 12 indicates pressure in conventional terms such inches of water column.

Figure 2:
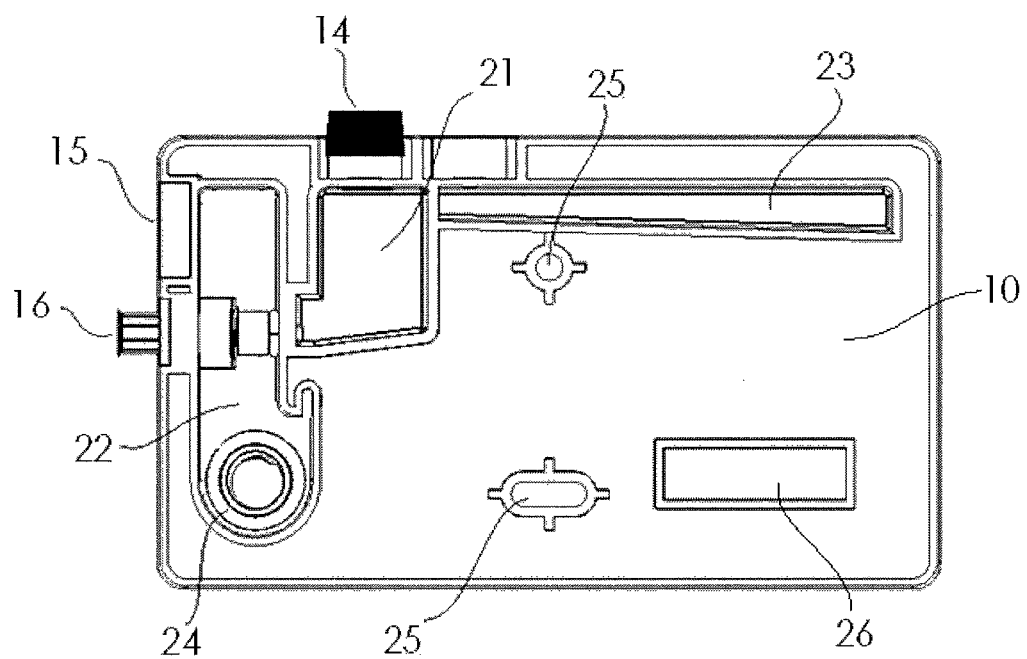
FIG. 2 is a cross-sectional front view of the manometer.

Referring to FIG. 2, a cut view of base housing assembly 10 reveals a measuring liquid storage reservoir 21, a second main reservoir 22 and an overflow chamber 23. Measuring liquid is prefilled into storage reservoir 21 during manufacturing and sealed into chamber with cap plug 14 and reservoir valve 16. After mounting and prior to first use, measuring liquid is released from storage reservoir 21 by loosening cap plug 14 and reservoir valve 16. Cap plug 14 contains vent holes in the threaded portion of cap to allow air to enter into storage reservoir 21. This allows the measuring liquid to flow freely into main reservoir 22. As the level of the measuring liquid reaches zero on the numeric scale 20, reservoir valve 16 is closed to prevent further flow of measuring liquid. Zero adjustment can then be made using a plunger or bladder assembly within cylinder 24. This will be described in more detail later when referring to FIGS. 4 & 5. Mounting posts 25 are molded to base housing 10 to provide additional rigidity. Base housing 10 also includes a recessed cavity 26 for housing a level vial.

Figure 3:
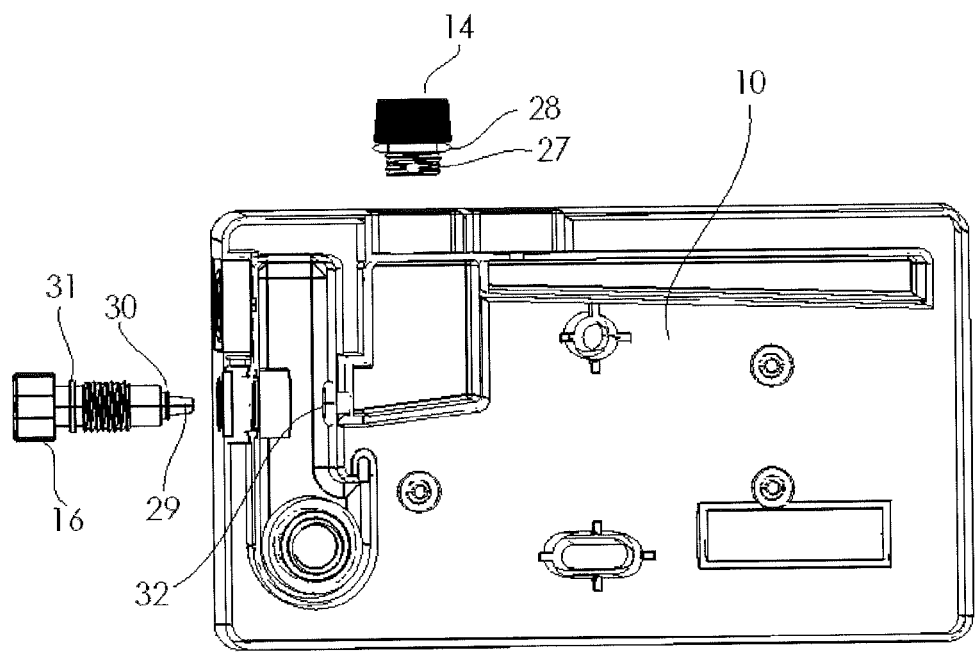
FIG. 3 is an exploded view of the fluid reservoir assembly.

Referring to FIG. 3, an exploded cut view of base housing 10 shows detail of a cap plug 14, reservoir valve 16 and passage way 32. Cap plug 14 is constructed with two through holes 27 within the threaded portion of the cap plug for air venting. O-ring 28 provides a leak proof seal when cap plug 14 is in the fully closed position. Reservoir valve 16 has a tapered end 29, O-ring 30 and O-ring 31. When in the closed position (fully threaded in), tapered end 29 fits into passage way 32 and O-ring 30 creates a leak proof seal. O-ring 31 is used to create an air tight seal between base housing 10 and reservoir valve 16.

Figure 4:
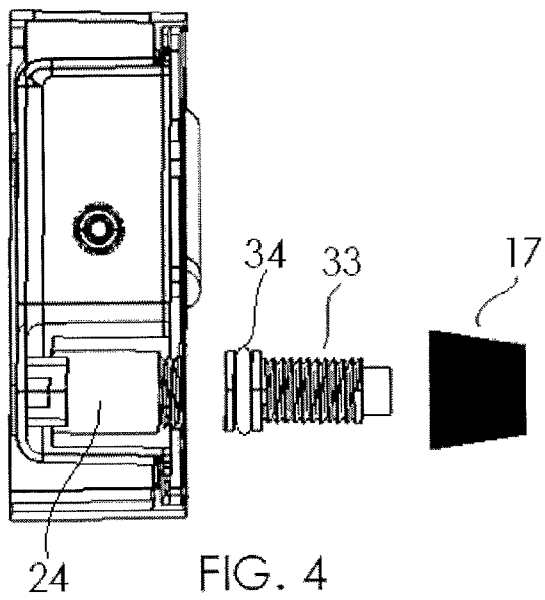
FIG. 4 is an exploded view of the zero adjustment plunger assembly.

Referring to FIG. 4, a threaded zero adjustment plunger 33 contains an O-ring 34 and is threaded into cylinder 24. O-ring 34 creates a leak proof seal as plunger 33 is threaded in or out of cylinder 24. Adjustment knob 17 is affixed to plunger 33 to facilitate ease of turning.

Figure 5:
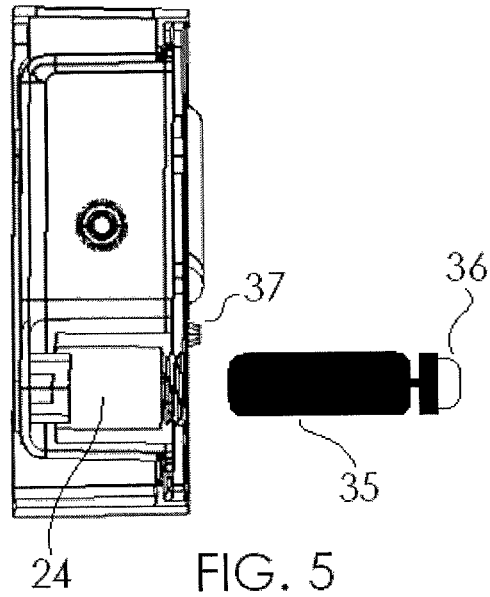
FIG. 5 is an exploded view of zero adjustment inflatable bladder assembly.

Referring to FIG. 5, an inflatable zero adjustment bladder 35 is permanently sealed into cylinder 24 to create a leak proof connection. Bladder 35 has one part consisting of inflation bulb 36 and release valve 37. To adjust the measuring liquid to zero, inflation bulb 36 is pressed a necessary number of times to inflate the bladder sufficiently thus raising the measuring liquid to the zero point on the scale. To lower the level, release valve 37 is loosened slowly which deflates the bladder resulting in the liquid level being lowered. The primary function of the threaded plunger in FIG. 4 and the inflatable bladder in FIG. 5 is to increase or decrease the solid mass within the main reservoir 22. Increasing the mass causes the liquid to be pushed higher in the clear sight tube 11. Inversely, reducing the mass will lower the liquid level in the clear sight tube.

Figure 6:
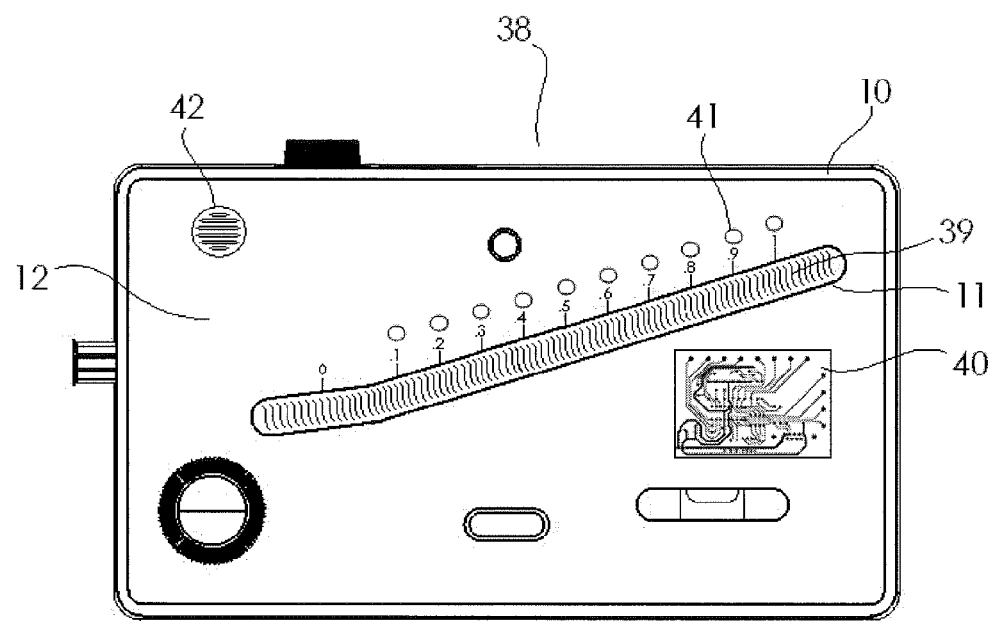
FIG. 6 is a front view representation of another arrangement including an electronically controlled liquid manometer.

Referring to FIG. 6, continuing with the previous description, an electronically controlled liquid manometer 38 includes additional features comprising a liquid level sensing device 39 embedded into base housing 10 along the length of the clear sight tube 11. Said sensing device 39 is connected to a circuit board 40 for communication to remote receivers via wired or wireless connection. Furthermore, resulting pressure measurement signals are processed through circuit board 40 and sent to LED lights 41 to form a lighted visual display of the pressure levels. Said array of LED lights 41 could form a green, yellow and red pattern starting from the bottom respectively to indicate a "green" or normal operating zone, a "yellow" or cautionary operating zone and a "red" or extreme condition operating zone. An audible alarm 42 is located on front panel 12 and connected to circuit board 40. If preset pressure levels are exceeded, the alarm will sound.

Figure 7:
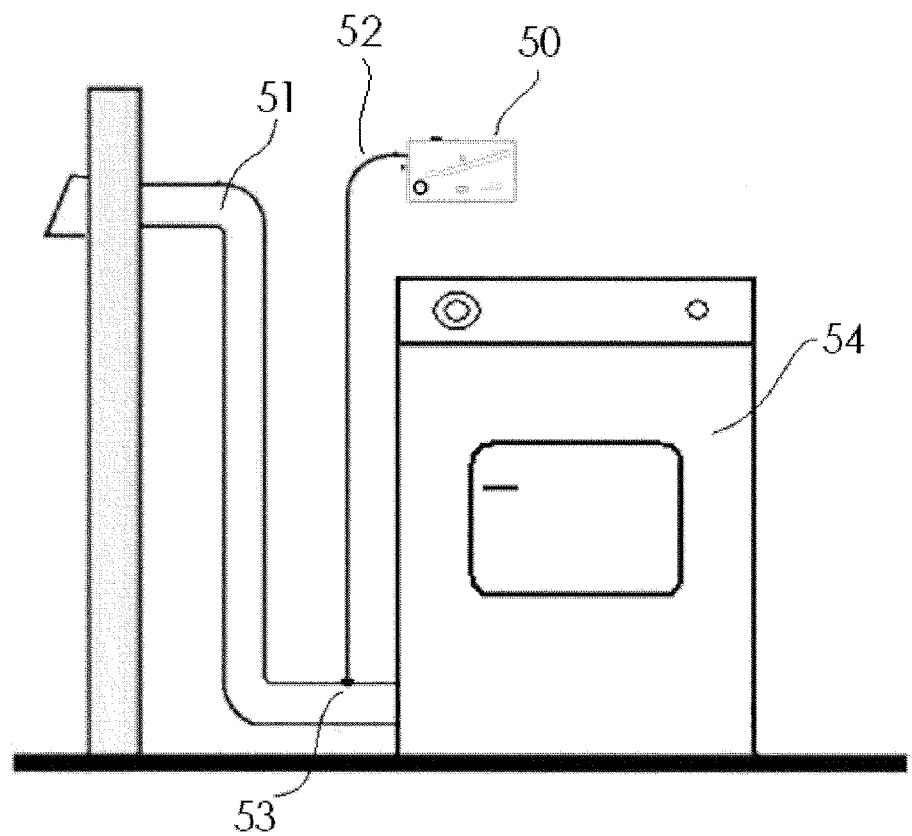
FIG. 7 is a perspective view of the manometer connected to a clothes dryer exhaust duct.

Referring to FIG. 7, the compact manometer 50 is connected to a clothes dryer exhaust duct 51 for the purpose of measuring back pressure in the vent system caused by restrictions, such as lint buildup, a crushed vent or a bird's nest. The manometer 50 is connected to exhaust duct 51 via a flexible tube 52 and exhaust duct fitting 53. When clothes dryer 54 is operating with no clothes in drum and no heat, true back pressure readings are measured by manometer 50.

Figure 8:
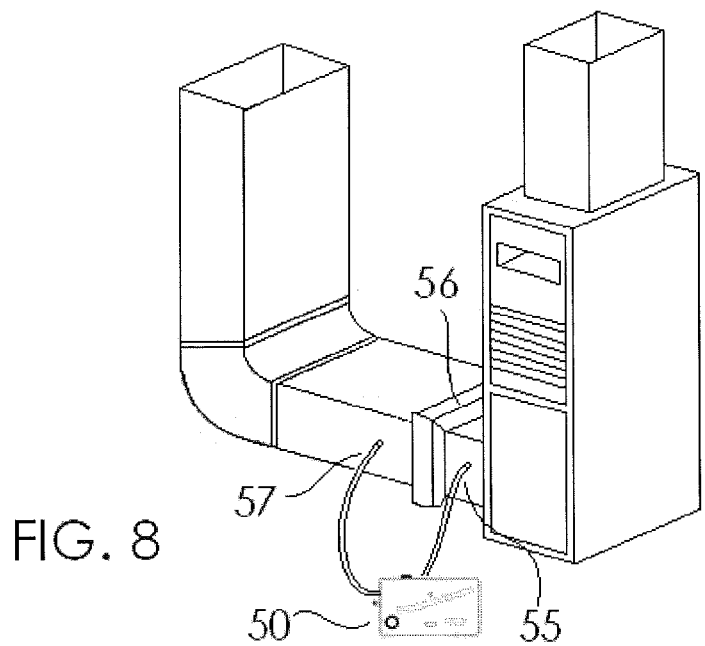
FIG. 8 is a perspective view of the manometer used on a HVAC system as a differential filter gage.

Referring to FIG. 8, the compact manometer 50 is connected to an HVAC system and used as a differential filter gage. The low pressure side of manometer 50 is connected to the discharge side 55 of the filter 56. The high pressure side of manometer 50 is connected to the upstream side 57 of filter 56. As the filter 56 becomes dirty, the pressure on the upstream side 57 will increase resulting in a change in differential pressure.

Figure 9:
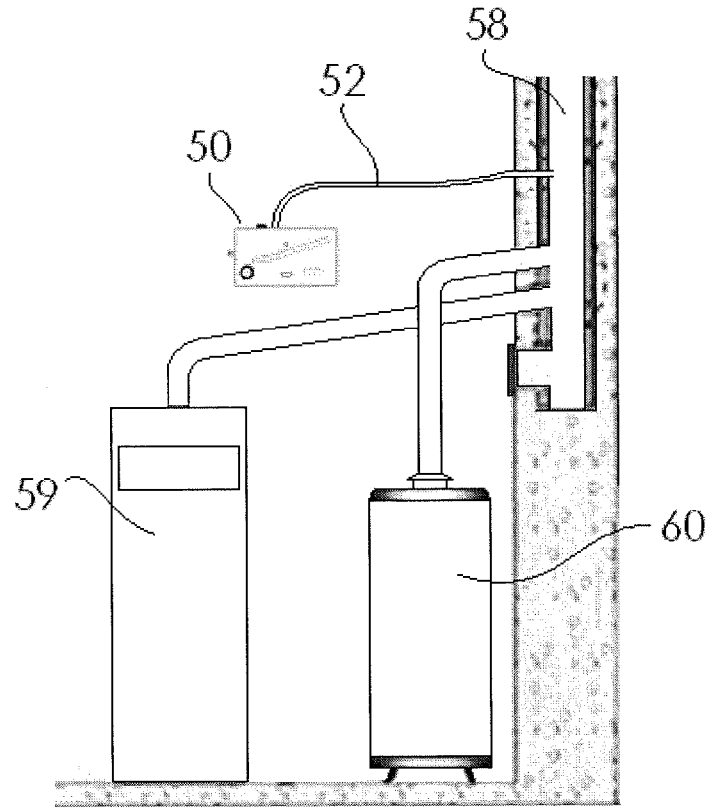
FIG. 9 is a perspective view of the manometer configured as a back draft safety device.

Referring to FIG. 9, a compact manometer 50 is configured as a back draft safety device. The manometer 50 is connected to a furnace chimney flue 58 via a flexible tube 52. If draft in the chimney flue 58 is reversed due to downdraft or blockage, the manometer 50 sounds an alarm and interrupts power to furnace 59 and water heater 60 preventing the appliance from turning on thus preventing carbon monoxide from entering the home or business.

While the invention has been described with respect to preferred embodiments, those skilled in the art will readily appreciate that various changes and/or modifications can be made to the invention without departing from the spirit or scope of the invention as defined by appended claims.

What is claimed is:

1. A compact sized manometer assembly for measuring air pressure, comprising:
   a housing assembly including a main body molded of plastic having two reservoirs, a panel molded of clear plastic having a sight tube, wherein said panel is sonic welded to the main body forming a permanent seal between reservoirs and sight tube, said panel forming a pressure tight enclosed chamber, and said panel having formed integrally thereon a chamber located in main reservoir for at least one of a zero adjust bladder or plunger; and
   a pressure measuring assembly including a storage reservoir for containing measuring fluid prior to a first use, a valve assembly threaded through the main body to allow fluid to selectively pass into the main reservoir, and said storage reservoir incorporates a vented cap plug used to contain fluid in the storage reservoir after filling, wherein said cap plug provides a means for pressure calibration by releasing precise amounts of pressure to the ambient thus lowering the pressure reading.

2. The compact manometer assembly of claim 1, further including an adjustable valve means to prevent flow of liquid from one reservoir to the other.

3. The compact manometer assembly of claim 1, further including an inflatable bladder assembly located in the main reservoir providing a means for adjusting the measuring fluid to zero prior to use.

4. The compact manometer assembly of claim 1, further including a threaded plunger assembly located in the main reservoir providing a secondary means for zero adjusting fluid.

5. The compact manometer assembly of claim 1, wherein said monometer includes a clear sight tube molded of clear plastic at a precise angle on front panel, said sight tube allows for flow of measuring fluid up or down in relationship to measure pressure.

6. The compact manometer assembly of claim 5, wherein said clear sight tube includes a liquid sensing device for converting the pressure measured by the fluid to an electrical signal.

7. The compact manometer assembly of claim 6, wherein said liquid sensing device is constructed of electronic or mechanical components in order to provide a means for converting the pressure measured by the liquid to an electronic signal.

8. The compact manometer assembly of claim 6, wherein said liquid sensing device is connected to a color LED light scale that provides additional visual indicating of pressure.

9. The compact manometer assembly of claim 8, wherein said LED light scale uses a recognizable color combination to indicate the level of concern related to the measured pressure.

10. The compact manometer assembly of claim 6, wherein said liquid sensing device is connected to an audible alarm.

11. The compact manometer assembly of claim 10, wherein said audible alarm has varying tones related to various pressure levels.

12. The compact manometer assembly of claim 6, wherein said liquid sensing device is connected to a central alarm system, said connection includes one or both of a hard wire or wireless type connection.

13. The compact manometer assembly of claim 12, wherein said liquid sensing device is in direct contact with one or more of a user's cell phone, a fire department, or a device capable of receiving a signal.

14. The compact manometer assembly of claim 1, wherein said manometer is connected to a chimney flue to sense one or both of low draft and back draft situations.

15. The compact manometer assembly of claim 1, wherein said manometer is in communication with a heating appliance, a central alarm, a user's cell phone, a fire station, and said manometer is connected to an interruption switch on the heating appliance to prevent harmful carbon monoxide from spilling into dwelling.

16. The compact manometer assembly of claim 1, wherein said manometer is used to measure differential pressure in heating and air duct systems caused by filter loading.

17. The compact manometer assembly of claim 16, wherein said manometer is connected to at least one of a remote alarm and a electronic visual indicator, wherein said indicator is operable to be located in an area easily monitored by a homeowner.

18. The compact manometer assembly of claim 16, wherein said manometer is connected to an interruption switch operable to prevent operation of one or both of a heating or an air conditioning unit when the air filter becomes flow impaired.

19. The compact manometer assembly of claim 1, wherein said manometer comprises an inflatable bladder operable to zero adjust the measuring liquid that is operated either manually or remotely by means of an electrical powered mechanism.

20. The compact manometer assembly of claim 1, wherein said manometer comprises a threaded plunger assembly operable to zero adjust the measuring liquid operated by hand or remotely by means of an electrical powered mechanism.

\* \* \* \* \*